United States Patent
Tanizawa et al.

(10) Patent No.: US 9,455,827 B2
(45) Date of Patent: Sep. 27, 2016

(54) COMMUNICATION APPARATUS, COMPUTER PROGRAM PRODUCT, AND COMMUNICATION SYSTEM

(71) Applicant: Kabushiki Kaisha Toshiba, Minato-ku (JP)

(72) Inventors: Yoshimichi Tanizawa, Yokohama (JP); Hideaki Sato, Yokohama (JP); Ririka Takahashi, Setagaya (JP); Alex Dixon, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 50 days.

(21) Appl. No.: 14/447,877

(22) Filed: Jul. 31, 2014

(65) Prior Publication Data

US 2015/0036825 A1    Feb. 5, 2015

(30) Foreign Application Priority Data

Aug. 1, 2013  (JP) ................... 2013-160709

(51) Int. Cl.
*H04L 9/00*  (2006.01)
*H04L 9/08*  (2006.01)

(52) U.S. Cl.
CPC ........... *H04L 9/0819* (2013.01); *H04L 9/0858* (2013.01)

(58) Field of Classification Search
CPC ........ H04L 9/08; H04L 9/0883; G06F 21/62
USPC ................. 380/277, 284, 255; 713/181, 171; 726/4–7
See application file for complete search history.

(56) References Cited

U.S. PATENT DOCUMENTS 7,430,295 B1 * 9/2008 Pearson ............... H04L 9/0858 380/256
7,577,257 B2 * 8/2009 Xia ....................... H04L 9/0858 380/255

(Continued)

FOREIGN PATENT DOCUMENTS

JP    4200909 B2    12/2008
JP    2014-53816 A   3/2014

OTHER PUBLICATIONS

Tzonelih Hwang, Provably secure third-party authenticated quantum key distribution protocols, Feb. 2007, vol. 4, pp. 71-80.*

(Continued)

*Primary Examiner* — Dede Zecher
*Assistant Examiner* — Viral Lakhia
(74) *Attorney, Agent, or Firm* — Oblon, McClelland, Maier & Neustadt, L.L.P (57) ABSTRACT

According to an embodiment, a communication apparatus includes a cryptographic key storage, a transmitter, a receiver, and a sharing controller. The cryptographic key storage stores therein one or more cryptographic keys shared with an external device. The transmitter transmits specifying information that specifies at least one of the cryptographic keys to the external device. The receiver receives determination information that indicates a result of determination, which is made by the external device based on the specifying information, on whether the shared cryptographic key is consistent between the apparatus and the external device. When receiving the determination information indicating that the shared cryptographic key is inconsistent between the apparatus and the external device, the sharing controller deletes the cryptographic key specified by the specifying information from the cryptographic key storage.

9 Claims, 5 Drawing Sheets

(56) References Cited

U.S. PATENT DOCUMENTS

| | | | | |
|---|---|---|---|---|
| 7,646,873 | B2* | 1/2010 | Lee | H04L 9/0852 380/277 |
| 7,899,183 | B2* | 3/2011 | Tajima | H04L 9/0844 380/255 |
| 8,005,213 | B2* | 8/2011 | Suga | G11B 20/00086 380/44 |
| 8,254,579 | B1* | 8/2012 | Morgan | H04L 9/083 380/277 |
| 8,488,790 | B2* | 7/2013 | Wellbrock | H04L 9/0855 380/255 |
| 8,681,982 | B2* | 3/2014 | Wiseman | H04L 9/0844 380/255 |
| 8,842,841 | B2* | 9/2014 | Hook | H04L 9/14 380/277 |
| 8,929,554 | B2* | 1/2015 | Hughes | H04L 9/0852 380/259 |
| 2011/0231665 | A1* | 9/2011 | Wiseman | H04L 9/0838 713/181 |
| 2013/0083926 | A1* | 4/2013 | Hughes | H04L 9/0836 380/278 |
| 2013/0101121 | A1* | 4/2013 | Nordholt | H04W 12/04 380/279 |
| 2013/0251145 | A1* | 9/2013 | Lowans | H04L 9/0838 380/44 |
| 2014/0181522 | A1 | 6/2014 | Tanizawa et al. | |

OTHER PUBLICATIONS

Mehrdad Dianati et al., "Architecture and Protocols of the Future European Quantum Key Distribution Network", Security and Communication Networks, 2008, pp. 57-74.

Christian Kollmitzer et al., "Appl ied Quantum Cryptography", Lecture Notes in Physics 797, 2010, 22 pages.

* cited by examiner

COMMUNICATION APPARATUS, COMPUTER PROGRAM PRODUCT, AND COMMUNICATION SYSTEM

CROSS-REFERENCE TO RELATED APPLICATION(S)

This application is based upon and claims the benefit of priority from Japanese Patent Application No. 2013-160709, filed on Aug. 1, 2013; the entire contents of which are incorporated herein by reference.

FIELD

Embodiments described herein relate generally to a communication apparatus, a computer program product, and a communication system.

BACKGROUND

In a cryptographic key generation and sharing system, there exist two networks (a cryptographic key sharing network and an application network). The cryptographic key sharing system is constituted of networked nodes that are connected to each other by a plurality of links. Each node has the function of generating a random number and sharing it with an opposed node that is connected thereto by a link and the function of performing cryptographic communication over a link by using the random number generated and shared as a cryptographic key (hereinafter, referred to as a "link key").

In a node, the function of generating a random number and sharing it with an opposed node that is connected thereto by a link can also be implemented using, for example, a technique that is commonly called "quantum cryptography" or "quantum key distribution (QKD)".

However, in the conventional technique, there has been a drawback that, in such a case that failures occur in nodes or errors occur in a network, there exists the possibility that inconsistency occurs in the cryptographic key information shared between nodes.

DETAILED DESCRIPTION

According to an embodiment, a communication apparatus includes a cryptographic key storage, a transmitter, a receiver, and a sharing controller. The cryptographic key storage stores therein one or more cryptographic keys shared with an external device. The transmitter transmits specifying information that specifies at least one of the cryptographic keys to the external device. The receiver receives determination information that indicates a result of determination, which is made by the external device based on the specifying information, on whether the shared cryptographic key is consistent between the apparatus and the external device. When receiving the determination information indicating that the shared cryptographic key is inconsistent between the apparatus and the external device, the sharing controller deletes the cryptographic key specified by the specifying information from the cryptographic key storage.

Embodiments are explained in detail below in reference to the accompanying drawings.

As described above, in a cryptographic key generation and sharing system, there has been a possibility that, in such a case that failures occur in nodes, inconsistency occurs in cryptographic key information shared between nodes. Furthermore, a method for verifying whether the inconsistency occurs in cryptographic key information or a method for resolving the inconsistency has been unapparent. As a method for resolving the inconsistency, it is conceivable that when failures or errors occur, all of cryptographic keys shared between nodes are revoked and a process of sharing a cryptographic key is performed again. However, the above-mentioned method is inefficient because a large number of cryptographic keys already shared are wasted.

In the present embodiment, to consider a case where there exist a group of communication apparatuses (nodes) sharing a cryptographic key, when the cryptographic key sharing operation is not normally performed due to failures in nodes or communication paths, cryptographic key consistency between the nodes is confirmed. For example, after the cryptographic key sharing operation can be restarted, for the purpose of holding and using without being revoked the cryptographic key that has been previously shared, consistency of the cryptographic key shared previously between nodes is confirmed. In the present embodiment, when the cryptographic key is inconsistent between nodes, the nodes delete such cryptographic keys. Accordingly, it is possible to verify whether the consistency of cryptographic key shared between a plurality of nodes is ensured and to resolve the inconsistency in the cipher keys between the nodes.

A node in the present embodiment has the following functions.

(1) When a cryptographic key sharing operation is restarted, a node exchanges a hash (hash value) of the shared cryptographic key with an opposed node to confirm whether hash values respectively held by both nodes are consistent with each other. With this, the node confirms whether the cryptographic key currently held can be used after restarting the key sharing operation (after rebooting, for example).

(2) On the premise of the above-mentioned confirmation process, the exchanged cryptographic keys in nodes are required to be consistent with each other. The timing of deleting a cryptographic key from a node is not prescribed in particular. However, in general, when the provision of a cryptographic key from a node to an application is completed, the node deletes therefrom the cryptographic key provided thereby. In the method for deleting a cryptographic key, depending on cryptographic key acquisition policies of applications connected to a node and an opposed node, cryptographic key data held by the node may be easily caused to be different from cryptographic key data held by the opposed node. In order to avoid such situation, a node according to the present embodiment does not delete the cryptographic key immediately after providing a cryptographic key to an application, but notifies an opposed node of the cryptographic key to be deleted and of the timing of deleting the cryptographic key, and deletes the cryptographic key in a synchronizing manner with the opposed node.

Figure 1:
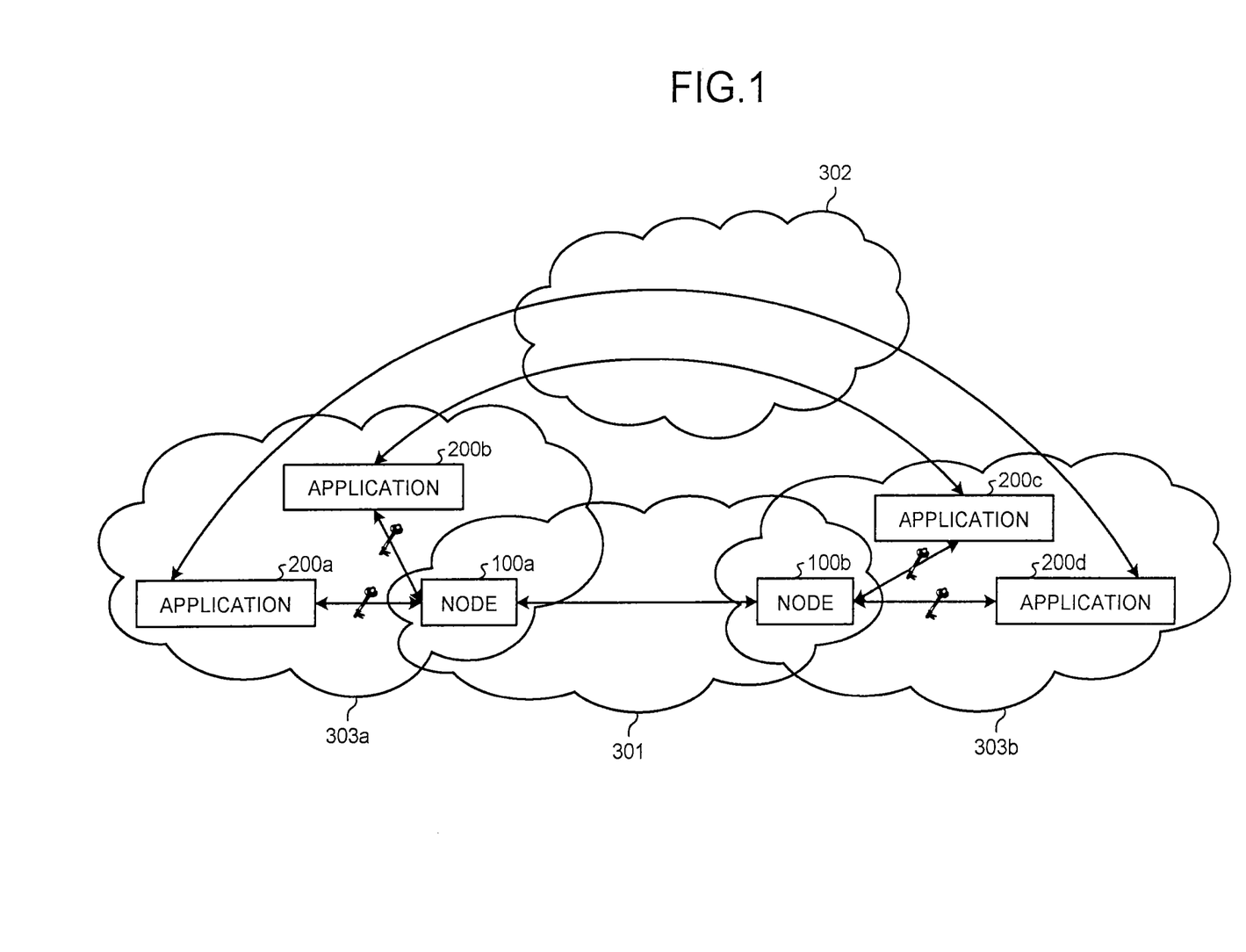
FIG. 1 is a network block diagram of a communication system according to an embodiment.

FIG. 1 is a view illustrating an example of a network configuration of a communication system according to the present embodiment. The communication system includes a cryptographic key sharing network 301, an application network 302, and private networks 303a and 303b. Furthermore, the communication system includes nodes 100a and 100b as a communication apparatus, and applications 200a to 200d.

When it is unnecessary to distinguish the nodes 100a and 100b, the nodes 100a and 100b may be merely referred to as the "node 100". When it is unnecessary to distinguish the applications 200a to 200d, the applications 200a to 200d may be merely referred to as the "application 200". The number of the node 100 is not limited to two. Furthermore, the number of the application 200 is not limited to four.

Each of the node 100a and 100b has, as described above, the function of generating a random number and sharing it with an opposed node connected thereto by a link and the function of performing cryptographic communication over a link by using the random number generated as a link key.

The node 100 may have the function of generating a random number independently of the link and the function of transmitting the random number generated to the other node.

The application 200 has the function of acquiring a link key from the node 100 connected thereto and performing cryptographic data communication with the other application (connected to an opposed node and capable of acquiring the same link key) by using the link key as a cryptographic key. The cryptographic data communication may be implemented via a network (application network) such as the Internet that is different from a cryptographic key sharing network. Furthermore, the node 100 and the application 200 may be implemented in an integrated manner. Each of the node 100 and the application 200 may be constituted as an independent terminal to transmit/receive an application key therebetween. FIG. 1 illustrates one example in the case that the node 100 and the application 200 are separately installed on the private networks 303a and 303b operated for the respective nodes 100a and 100b.

The private networks 303a and 303b are networks for connecting a certain node 100 and an application 200 to which the node 100 provides an application key.

Figure 2:
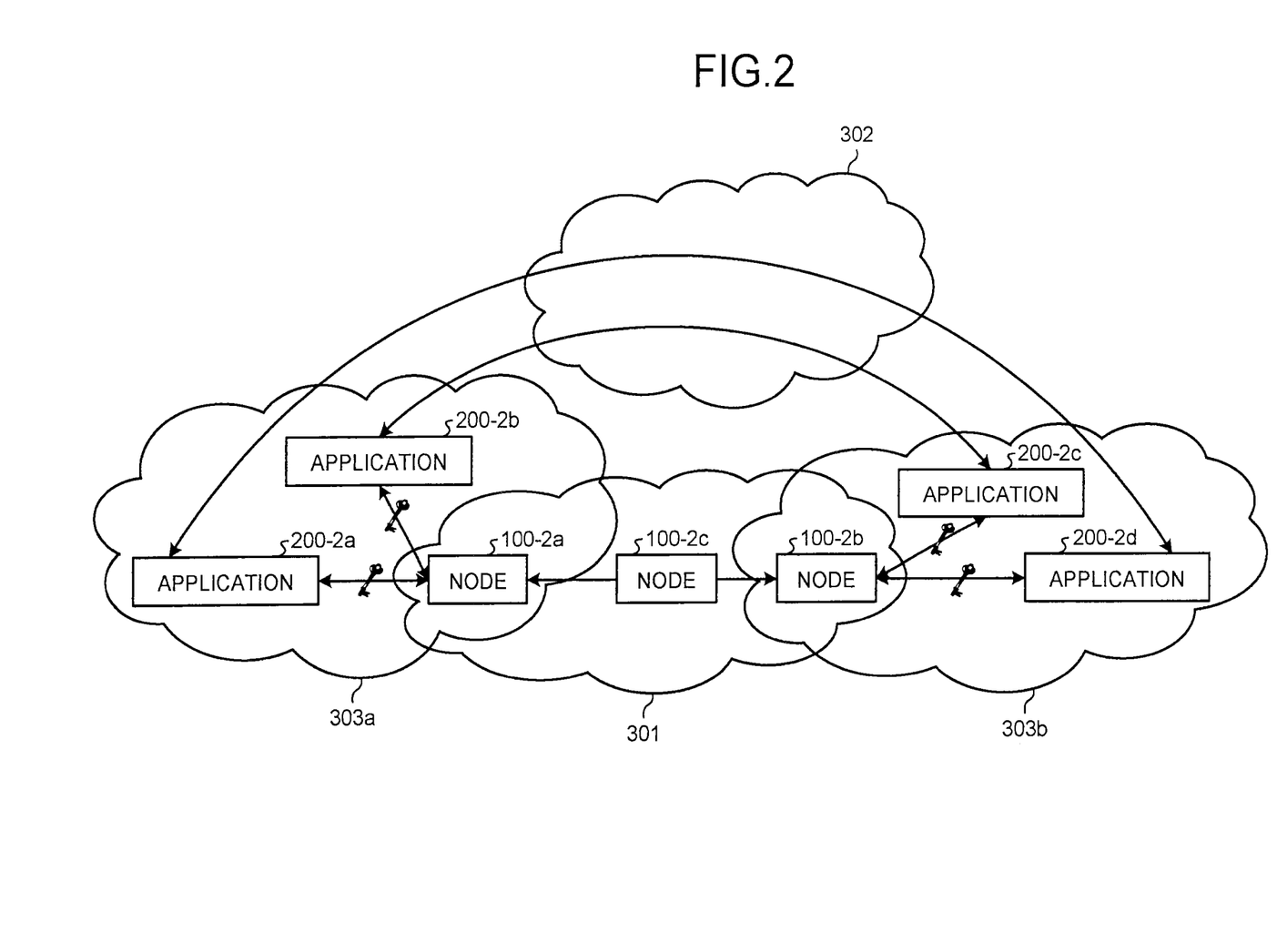
FIG. 2 is a network block diagram of a communication system in the embodiment.

FIG. 2 is a view illustrating another example of a network configuration of a communication system according to the present embodiment. The communication system includes the cryptographic key sharing network 301, the application network 302, and the private networks 303a and 303b. Furthermore, the communication system comprises nodes 100-2a to 100-2c and applications 200-2a to 200-2d.

When it is unnecessary to distinguish the nodes 100-2a to 100-2c, the nodes 100-2a to 100-2c may be merely referred to as the "node 100-2". When it is unnecessary to distinguish the applications 200-2a to 200-2d, the applications 200-2a to 200-2d may be merely referred to as the "application 200-2". In the example illustrated in FIG. 2, the node 100-2 and the application 200-2 differ in function from the node 100 illustrated in FIG. 1. The other constitutional features are identical in function with the case in FIG. 1 and hence, the constitutional features having identical functions are given same numerals and their repeated explanations are omitted.

The node 100-2 has a function of generating a cryptographic key (hereinafter, referred to as an "application key") that is a random number independently of a link and a function of transmitting the generated application key to the other node 100-2 via a link.

The application 200-2 has a function of acquiring the application key from the node 100-2 and performing cryptographic data communication with the other application 200-2 by using the application key acquired thereby as a cryptographic key.

As described above, in FIG. 1, the node 100 shares a link key with the other node 100. In FIG. 2, the node 100-2 shares a link key and an application key with the other node 100-2. In this manner, a shared cryptographic key may be a link key (first cryptographic key) or an application key (second cryptographic key) generated from the link key. Hereinafter, the term referred to as a "cryptographic key" is used as a term indicating both of the link key and the application key. Furthermore, hereinafter, the explanation is further made by taking the constitution illustrated in FIG. 1 as an example, and also applied to the constitution illustrated in FIG. 2 in the same manner. That is, in FIGS. 1 and 2, only the shared cryptographic keys are different from each other, and the following functions are applicable to both of the constitutions in FIGS. 1 and 2 in common.

Figure 3:
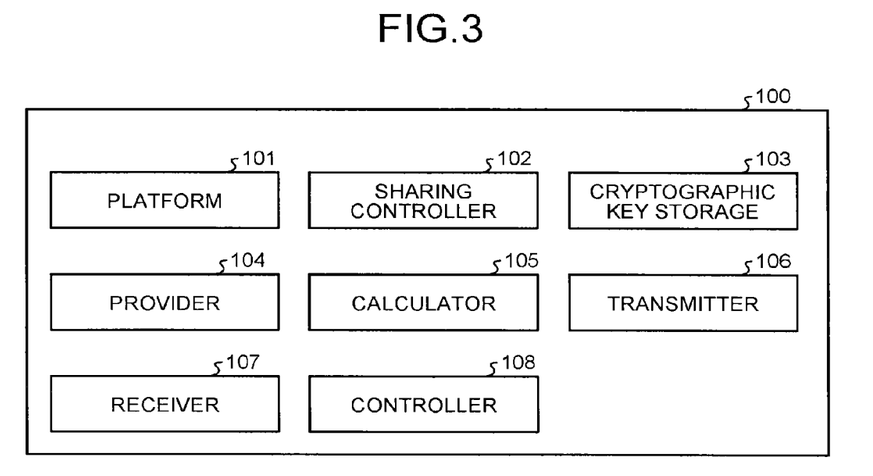
FIG. 3 is a block diagram of a node in the embodiment.

FIG. 3 is a block diagram illustrating an example of a configuration of the node 100 in the present embodiment. The node 100 includes a platform 101, a sharing controller 102, a cryptographic key storage 103, a provider 104, a calculator 105, a transmitter 106, a receiver 107, and a controller 108.

The platform 101 functions as an operating system of a computer that implements the node 100, and provides basic functions such as a process control function, a network function, and a security function.

The sharing controller 102 controls the cryptographic key sharing operation (a technique of distributing a quantum key may be included) with the other node 100. The shared cryptographic key is stored in the cryptographic key storage 103. Furthermore, the sharing controller 102 also performs the control of restarting the cryptographic key sharing operation and the synchronization of deleting the cryptographic key.

The cryptographic key storage 103 accumulates and stores therein one or more cryptographic keys shared with the other node 100.

The provider 104 is a communication interface with the application 200. The provider 104 complies, for example, with a request from the application 200 to provide the cryptographic key stored in the cryptographic key storage 103 to the application 200.

The calculator 105 calculates a hash value of the cryptographic key that is required for controlling the restart of the sharing controller 102. For example, the calculator 105 calculates, in reference to the cryptographic key stored in the cryptographic key storage 103, a hash value with respect to a single cryptographic key or a group of cryptographic keys, and provides the hash value calculated thereby to the sharing controller 102.

The hash value is one example of specifying information for specifying at least one cryptographic key. The other node 100 compares a hash value calculated by the calculator 105 with a hash value calculated from a cryptographic key stored in the other node 100 itself, thereby determining whether the shared cryptographic key is consistent between the nodes 100.

The specifying information is not limited to the hash value, and any kind of information that specifies a cryptographic key may be used. For example, specifying information calculated from a cryptographic key by an algorithm other than a hash value used in common among a plurality of nodes 100 may be used. Furthermore, for example, identification information (cryptographic key ID) imparted to a cryptographic key may be used as the specifying information. To consider a case where the cryptographic key ID is used as the specifying information, if the cryptographic key ID is consistent between the nodes but cryptographic key per se is inconsistent between the nodes, it is usually impossible to detect an abnormality (inconsistency). The hash value is used as the specifying information, thereby avoiding such a problem.

The transmitter 106 transmits the specifying information (a hash value calculated by the calculator 105) to the other node 100. The receiver 107 receives determination information from the other node 100. The determination information is information indicating a result of determination, which is made by the other node 100 based on the specifying information transmitted by the transmitter 106, on whether cryptographic key shared with each other is consistent between the nodes 100.

When determination information indicating that the cryptographic key is not consistent between the nodes is received, the above-mentioned sharing controller 102 controls, for example, deleting the cryptographic key specified by the specifying information from the cryptographic key storage 103.

The controller 108 controls the whole of the node 100.

The platform 101, the sharing controller 102, the provider 104, the calculator 105, the transmitter 106, the receiver 107, and the controller 108 may be implemented by executing a computer program by a processing device such as a central processing unit (CPU); that is, implemented by using software, implemented by using hardware such as an integrated circuit (IC), or implemented by using software and hardware in combination.

Here, the cryptographic key storage 103 may be any storage medium generally used, such as a hard disk drive (HDD), an optical disk, a memory card, or a random access memory (RAM).

Figure 4:
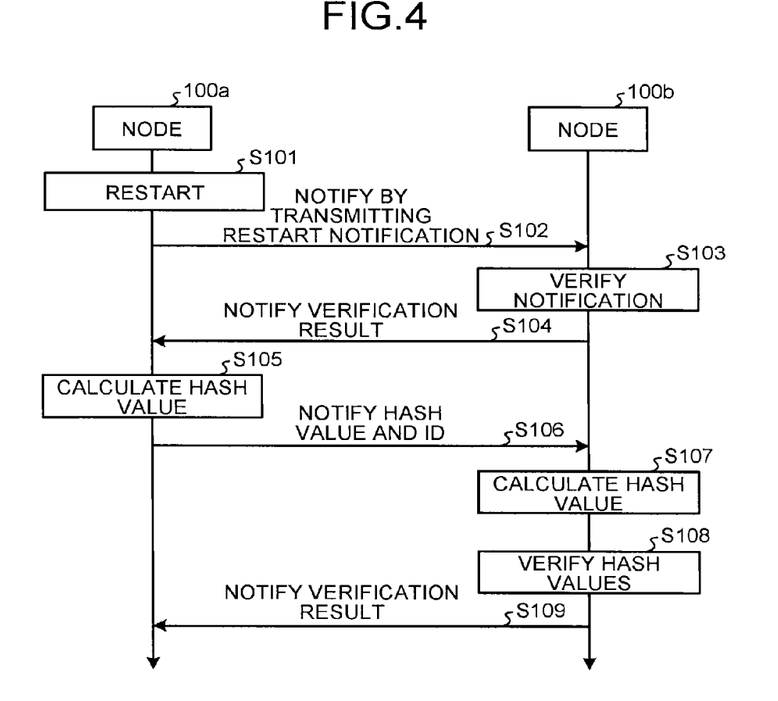
FIG. 4 is a sequence diagram of cryptographic key verification process in the embodiment.

Next, cryptographic key verification process performed by the node 100, which is constituted in this manner, according to the present embodiment is explained in conjunction with FIG. 4. FIG. 4 is a sequence diagram illustrating one example of the cryptographic key verification process in the present embodiment.

First of all, the node 100a and the node 100b share a cryptographic key as a premise. The cryptographic key sharing operation is performed based on a quantum key distribution technique or the like. A timing of the cryptographic key sharing between the node 100a and the node 100b is basically synchronized. Accordingly, inconsistency of the shared cryptographic keys is impossible to occur under normal circumstances. The cryptographic key is stored in the cryptographic key storage 103 included in each of the node 100a and the node 100b.

In the present embodiment, it is assumed that, attributed to the following states (a) and (b), for example, the synchronization of the cryptographic key sharing may not be maintained or must be stopped.

(a) One or both of the node 100a and the node 100b, are suddenly stopped during the cryptographic key sharing operation in consequence of a power failure, or the like.

(b) Some kind of failure occurs in a part of a link (or a network) used for the cryptographic key sharing between the node 100a and the node 100b, resulting in a temporary inaccessible state from one node to the other node. Under these circumstances, the state of the node cannot be grasped.

In such a state, the node 100 performs some kind of processing to restart the synchronized key sharing operation (step S101). For example, in the state (a), the node 100 stopped is restarted manually by an administrator or automatically and the cryptographic key sharing operation is restarted. Furthermore, for example, in the state (b), the restoration of the link (or the network) is confirmed and thereafter, the cryptographic key sharing operation is reinitialized. However, in a state that the cryptographic key sharing operation is reinitialized or restarted, it is uncertain that the synchronization of the cryptographic key between nodes is maintained.

The cryptographic key verification process is performed when the cryptographic key sharing operation is restarted. Alternatively, the cryptographic key verification process may be performed when the node 100 is started first, or may be periodically performed, for example.

The node 100a that has determined to restart (or reinitialize) the cryptographic key sharing operation transmits restart notification data for restarting the cryptographic key sharing operation to the node 100b (step S102). The restart notification data contains, for example, ID information for identifying the node 100a. The restart notification data may further contain ID information of the node 100b. The restart notification data may be exchanged as a control signal of the cryptographic key sharing network. For example, in the case where a cryptographic key is shared by using the quantum key distribution technique, the restart notification data may be transmitted by using a transmission channel for transmitting a control signal, the transmission channel being different from a transmission channel for transmitting the cryptographic key.

Furthermore, the restart notification data may be encrypted (and/or authenticated) by using a cryptographic key that is shared before restarting. The restart notification data may be exchanged via the application network 302. In this case too, the restart notification data may be encrypted (and/or authenticated) by using the cryptographic key that is shared before restarting.

After receiving the restart notification data, the node 100b verifies ID information contained in the restart notification data to confirm whether the restart notification data is valid (step S103). For example, the node 100b confirms whether the ID information is ID information of the node 100a.

When there is no problem in the restart notification data, the node 100b outputs an OK signal (a verification result) that notifies of the acceptance of the restarting process (step S104). Variations of a method for transmitting the verification result are conceivable in the same manner as described with respect to step S102.

After receiving the OK signal, the calculator 105 of the node 100a calculates (all or some of) hash values of cryptographic key that are currently held by the node 100a (step S105). Here, the hash values of at least part of the cryptographic keys may be calculated in advance. The hashing algorithm to be used is set in advance.

The transmitter 106 of the node 100a notifies the node 100b of the calculated hash values and the cryptographic key IDs (or alternatively, a range of the cryptographic key IDs when a hash value of combined cryptographic keys together is calculated) of the cryptographic keys used for calculating those hash values (step S106). Variations of a method for transmitting a notification are conceivable in the same manner as described with respect to step S102.

The node 100b calculates the hash values of the cryptographic keys, which correspond to the received cryptographic key IDs, stored in the cryptographic key storage 103 included in the node 100b (step S107). Here, at least part of the cryptographic keys may be calculated in advance. The hashing algorithm to be used is set in advance. The node 100b compares the calculated hash value with the hash value received from the node 100a to verify (determine) whether both hash values are consistent with each other (step S108).

The node 100b notifies the node 100a of determination information indicating a determination result (step S109). For example, when both hash values are consistent with each other, the node 100b outputs an OK signal indicating that both hash values are consistent with each other. The OK signal may contain the cryptographic key IDs (or a range of the cryptographic key IDs) of the cryptographic keys whose hash values are consistent with each other. In contrast, when both hash values are inconsistent with each other, the node 100b outputs an NG signal indicating that both hash values are inconsistent with each other. The NG signal may contain the cryptographic key IDs (or a range of the cryptographic key IDs) of the cryptographic keys whose hash values are inconsistent with each other. Furthermore, the NG signal may contain the cryptographic key IDs (or a range of the cryptographic key IDs) of the cryptographic keys held by the node 100b and the hash values of the cryptographic keys held by the node 100b.

When it is confirmed that all of the cryptographic keys held by the node 100a are consistent with the cryptographic keys held by the node 100b, the cryptographic key verification process is completed. As a result, it can be confirmed that the cryptographic keys shared before reinitializing the node 100a or before reinitializing the key sharing operation are consistent between the nodes, and no error occurs in the cryptographic key data due to deviation of synchronization or the like.

In contrast, when it is confirmed that part of the cryptographic keys are consistent between the nodes, in order to further confirm whether the other part of the cryptographic keys are consistent between the nodes, process from steps S105 to S109 may be repeated while changing a target cryptographic key.

Furthermore, when it is confirmed that part of the cryptographic keys are inconsistent between the nodes, it is confirmed that the cryptographic key data of that part of the cryptographic keys is corrupted for the reason of deviation of synchronization or the like due to failures. Therefore, in this case, the target cryptographic key is revoked (deleted) and thereafter, the process from steps S105 to S109 is repeated while further changing a target cryptographic key. Here, the process from steps S105 to S109 may be repeated while changing the range of the cryptographic keys (narrowing the range, for example) without entirely revoking that part of the cryptographic keys that are inconsistent between the nodes.

In this manner, consistency of cryptographic keys shared between the node 100a and the node 100b is confirmed, and corrupted cryptographic keys are specified and revoked, thus reproducing eventually a state in which the nodes hold only the cryptographic keys that are consistent between the nodes.

As described above, when the cryptographic key verification process is completed, the shared cryptographic keys, which are used before the cryptographic key sharing operation is reinitialized or restarted, can be directly used. Here, the cryptographic key sharing operation may be started after the completion of the cryptographic key verification process or started after step S102, for example.

Figure 5:
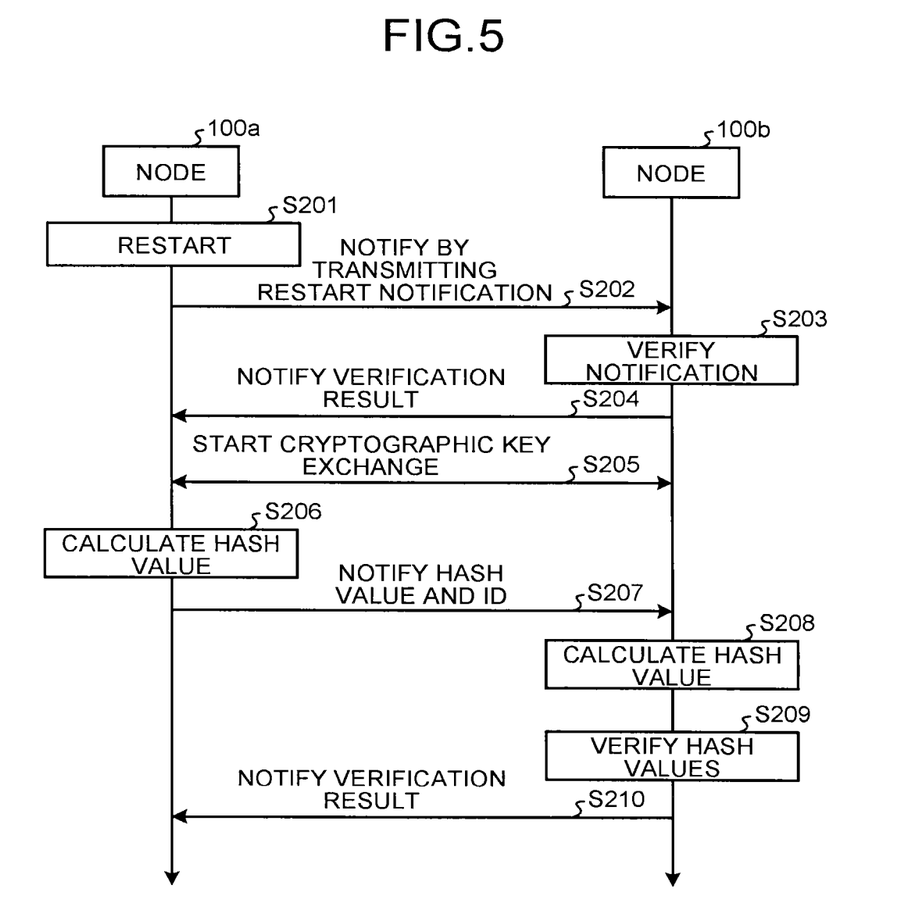
FIG. 5 is a sequence diagram of cryptographic key verification process in the embodiment.

Next, with reference to FIG. 5, another example of the cryptographic key verification process is explained. FIG. 5 is a sequence diagram illustrating another example of the cryptographic key verification process in the present embodiment. Process from step S201 to step S204 is identical with process from step S101 to step S104 in FIG. 4, and the explanation thereof is omitted.

After receiving an OK signal indicating a fact that restarting process is accepted, a sharing controller 102a of the node 100a restarts the cryptographic key sharing operation with a sharing controller 102b of the node 100b (step S205). Accordingly, data to be transmitted subsequently can be encrypted (and/or authenticated) by using a cryptographic key that is newly shared by the restarted the cryptographic key sharing operation.

That is, for example, the node 100a transmits a hash value encrypted by a cryptographic key that is newly shared with the node 100b and a cryptographic key ID of that cryptographic key (step S207). Furthermore, for example, the node 100b transmits a verification result (determination information) encrypted by the cryptographic key that is newly shared (step S210). Process from step S206 to step S210 is identical with process of from step S105 to step S109 in FIG. 4 except that the data is encrypted.

In the example illustrated in FIG. 4, the hash value may be encrypted (and/or authenticated) by using a cryptographic key shared before restarting the cryptographic key sharing operation. However, there exists the possibility that a cryptographic key shared before restarting the cryptographic key sharing operation is actually corrupted with reinitializing. As the example illustrated in FIG. 5, when a cryptographic key that is newly shared is used, there exists no possibility that the cryptographic key is corrupted, thus lowering the possibility of the occurrence of errors due to the exchange of data in process from step S207 to step S210, for example.

Figure 6:
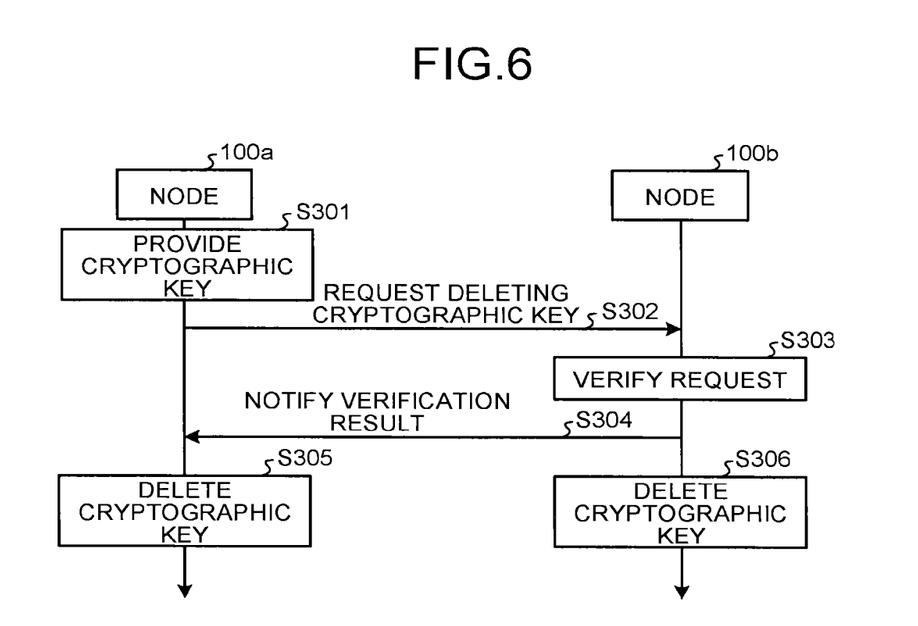
FIG. 6 is a sequence diagram of cryptographic key deletion process in the embodiment.

Next, with reference to FIG. 6, cryptographic key deletion process is explained. FIG. 6 is a sequence diagram illustrating one example of the cryptographic key deletion process in the present embodiment.

First of all, reasons why the cryptographic key deletion process is needed are explained. It is an object of the present embodiment to confirm that cryptographic keys shared between the node 100a and the node 100b are consistent therebetween even after restarting the cryptographic key sharing operation and can be used as cryptographic keys. Accordingly, a cryptographic key held by the node 100a and a cryptographic key held by the node 100b are basically required to be synchronized (consistent) with each other. The timing of increasing the number of cryptographic keys (generating cryptographic keys) is specified in the protocol of cryptographic key sharing and basically synchronized (although there exists the case that the timing is deviated due to the errors).

In contrast, the timing of decreasing the number of cryptographic keys (this generally occurs, that is, when the cryptographic key is provided to the application 200 to which the node 100 is connected) changes depending on implementation or behavior of an application connected to a node. This phenomenon is caused by a fact that the timing of deleting a cryptographic key from the node 100 is synchronized with the timing of providing a cryptographic key to the application 200 to which the node 100 is connected (that is, a cryptographic key is deleted from the node 100 immediately after the cryptographic key is provided to an application).

As for the consistency between sets of cryptographic keys held by the node 100a and the node 100b at all times, it is reasonable to say that the sets of cryptographic keys are inconsistent with each other due to the behavior of the application 200 to which the node 100 is connected. Unlike such a general method of deleting a cryptographic key, in the present embodiment, irrespective of the implementation or behavior of the application 200, the timing of deleting cryptographic keys is synchronized between the nodes 100. With this, a situation in which data contents of cryptographic keys are basically consistent with each other can be provided even when restarting the cryptographic key sharing operation attributed to the occurrence of errors.

Conversely, in the absence of such a method of synchronizing the timing of deleting cryptographic keys, when the above-mentioned cryptographic key verification process is performed, a large number of cryptographic keys that are held by one node 100 but not held by the other node 100 will be found.

In response to a request from the application 200 (the application 200a in FIG. 1, for example), the node 100a provides a cryptographic key to the application 200 (step S301). Likewise, in response to a request from the application 200 (the application 200b in FIG. 1, for example), the node 100b provides a cryptographic key to the application 200. The provision of each cryptographic key asynchronously occurs in the node 100a and the node 100b.

In deleting a cryptographic key, the node 100 notifies an opposed node of a fact that the cryptographic key is to be deleted and of a cryptographic key ID to be deleted. For example, the node 100a transmits a request of deleting a cryptographic key and a cryptographic key ID to the node 100b (step S302). Here, data exchanges for deleting the cryptographic key are performed independently of the provision of the cryptographic key (step S301). Alternatively, a process of step S302 may be performed each time when the cryptographic key is provided. Still alternatively, after the provision of a cryptographic key is performed multiple times, requests of deleting cryptographic keys in step S302 may also be performed together.

The opposed node (the node 100b) that receives the request of deleting a cryptographic key and the cryptographic key ID to be deleted verifies whether a cryptographic key of the received cryptographic key ID can be deleted (step S303). For example, the node 100b determines whether the cryptographic key of the received cryptographic key ID has been previously used. The node 100b notifies the node 100a of a verification result (step S304). For example, when the cryptographic key of the received cryptographic key ID 100a can be deleted, the node 100b notifies the node 100a of the verification result (OK response) indicating that the cryptographic key can be deleted.

After determination is made between the nodes that there is no problem with respect to the deletion of the cryptographic key, both nodes (the node 100a and the node 100b) delete cryptographic keys to be deleted (step S305, step S306).

In this manner, in the communication apparatus according to the present embodiment, it is possible to verify whether cryptographic keys shared between a plurality of nodes are consistent therebetween and resolve the inconsistency in the cryptographic keys. For example, in a cryptographic key exchange and sharing system based on the quantum key distribution technique, the cryptographic key is one of the most important system resources. Therefore, the cryptographic key that is an important system resource can be used continuously after failure restoration without revoking the cryptographic key, thereby reducing system operating time and cost substantially.

Figure 7:
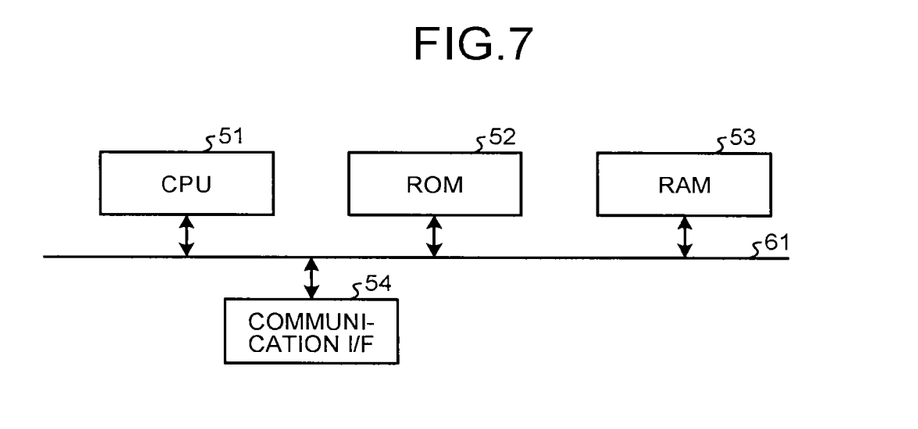
FIG. 7 is a hardware block diagram of a communication apparatus in the embodiment.

Next, hardware configuration of the communication apparatus according to the present embodiment is explained in conjunction with FIG. 7. FIG. 7 is an explanatory view illustrating the hardware configuration of the communication apparatus according to the present embodiment.

The communication apparatus according to the present embodiment comprises a control device such as a central processing unit (CPU) 51, a storage device such as a read only memory (ROM) 52 and a random access memory (RAM) 53, a communication I/F 54 that is connected to a network to perform communication, and a bus 61 that connects the respective components to each other.

A computer program executed in the communication apparatus according to the present embodiment is provided in the form of the ROM 52 or the like in which the computer program is embedded in advance.

The computer program executed in the communication apparatus according to the present embodiment may be provided as a computer program product in the form of a computer-readable storage medium such as a compact disc read only memory (CD-ROM), a flexible disk (FD), a compact disc recordable (CD-R), or a digital versatile disc (DVD) in which the computer program is stored in an installable or executable file.

The computer program executed in the communication apparatus according to the present embodiment may be stored in a computer connected to a network such as the Internet and provided by being downloaded via the network. Furthermore, the computer program executed in the communication apparatus according to the present embodiment may be provided or distributed via a network such as the Internet.

The computer program executed in the communication apparatus according to the present embodiment allows a computer to function as each element (the platform 101, the sharing controller 102, the provider 104, the calculator 105, the transmitter 106, the receiver 107, or the controller 108) of the above-mentioned communication apparatus. The computer can execute the computer program read from the computer-readable recording medium onto a main memory by the CPU 51.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus comprising:
   a cryptographic key storage configured to store therein one or more cryptographic keys shared with an external device;
   a transmitter configured to transmit first specifying information that specifies at least one of the cryptographic keys to the external device, the first specifying information including at least identification information and a hash value of the cryptographic key, the identification information identifying the cryptographic key;

a receiver configured to receive determination information that indicates a result of determination, which is made by the external device based on the first specifying information, on whether the shared cryptographic key is consistent between the apparatus and the external device; and a sharing controller configured to, when receiving the determination information indicating that the shared cryptographic key is inconsistent between the apparatus and the external device, delete the cryptographic key identified by the identification information included in the first specifying information from the cryptographic key storage; wherein when receiving the determination information indicating that the shared cryptographic key is inconsistent between the apparatus and the external device, the transmitter transmits, to the external device, second specifying information that specifies at least one of the cryptographic keys other than the cryptographic keys identified by the identification information included in the first specifying information, and the cryptographic key storage stores therein a cryptographic key generated by quantum key distribution with the external device.

2. The apparatus according to claim 1, wherein the first specifying information and the second specifying information are information that specifies all of the cryptographic keys stored in the cryptographic key storage.

3. The apparatus according to claim 1, wherein the first specifying information and the second specifying information are information that specifies part of the cryptographic keys out of the cryptographic keys stored in the cryptographic key storage.

4. The apparatus according to claim 1, wherein the transmitter transmits the first specifying information and the second specifying information encrypted by a cryptographic key to the external device.

5. The apparatus according to claim 4, wherein
the sharing controller generates a new cryptographic key shared with the external device, and
the transmitter transmits the first specifying information and the second specifying information encrypted by the new cryptographic key generated by the sharing controller to the external device.

6. The apparatus according to claim 1, wherein
the transmitter further transmits identification information that identifies the cryptographic key to be deleted from the cryptographic key storage to the external device, and
the sharing controller deletes the cryptographic key identified by the transmitted identification information from the cryptographic key storage.

7. The apparatus according to claim 1, wherein the cryptographic key storage stores therein a second cryptographic key generated by using a first cryptographic key generated by quantum key distribution.

8. A computer program product comprising a non-transitory computer-readable medium containing a computer program, the computer program causing a computer that includes a cryptographic key storage configured to store therein one or more cryptographic keys shared with an external device to perform:

transmitting first specifying information that specifies at least one of the cryptographic keys to the external device, the first specifying information including at least identification information and a hash value of the cryptographic key, the identification information identifying the cryptographic key;

receiving determination information that indicates a result of determination, which is made by the external device based on the first specifying information, on whether the shared cryptographic key is consistent between the computer and the external device;

deleting, when receiving the determination information indicating that the shared cryptographic key is inconsistent between the computer and the external device, the cryptographic key identified by the identification information included in the first specifying information from the cryptographic key storage;

transmitting to the external device, when receiving the determination information indicating that the shared cryptographic key is inconsistent between the computer and the external device, second specifying information that specifies at least one of the cryptographic keys other than the cryptographic keys identified by the identification information included in the first specifying information; and storing in the cryptographic key storage a cryptographic key generated by quantum key distribution with the external device.

9. A communication system comprising:
a plurality of communication apparatuses, each of the communication apparatuses comprising:
a cryptographic key storage configured to store therein one or more cryptographic keys shared with another communication apparatus;
a transmitter configured to transmit first specifying information that specifies at least one of the cryptographic keys to the other communication apparatus, the first specifying information including at least identification information and a hash value of the cryptographic key, the identification information identifying the cryptographic key;
a receiver configured to receive determination information indicating a result of determination, which is made by the other communication apparatus based on the first specifying information, on whether the shared cryptographic key is consistent between the apparatuses; and
a sharing controller configured to, when receiving the determination information indicating that the shared cryptographic key is inconsistent between the apparatuses, delete the cryptographic key identified by the identification information included in the first specifying information from the cryptographic key storage; wherein when receiving the determination information indicating that the shared cryptographic key is inconsistent between the apparatuses, the transmitter transmits, to the other communication apparatus, second specifying information that specifies at least one of the cryptographic keys other than the cryptographic keys identified by the identification information included in the first specifying information, and the cryptographic key storage stores therein a cryptographic key generated by quantum key distribution with the other communication apparatus.

* * * * *